US012773745B2

(12) United States Patent
Huang

(10) Patent No.: US 12,773,745 B2
(45) Date of Patent: Oct. 27, 2026

(54) METHOD FOR PREPARING LAMINATION PLAN

(71) Applicant: KOBE STEEL, LTD., Hyogo (JP)

(72) Inventor: Shuo Huang, Kobe (JP)

(73) Assignee: KOBE STEEL, LTD., Hyogo (JP)

(*) Notice: Subject to any disclaimer, the term of this patent is extended or adjusted under 35 U.S.C. 154(b) by 609 days.

(21) Appl. No.: 18/547,142

(22) PCT Filed: Jan. 28, 2022

(86) PCT No.: PCT/JP2022/003449
§ 371 (c)(1),
(2) Date: Aug. 18, 2023

(87) PCT Pub. No.: WO2022/176578
PCT Pub. Date: Aug. 25, 2022

(65) Prior Publication Data

US 2024/0131608 A1 Apr. 25, 2024
US 2024/0227051 A9 Jul. 11, 2024

(30) Foreign Application Priority Data

Feb. 19, 2021 (JP) ................................ 2021-025576

(51) Int. Cl.
*B23K 9/04* (2006.01)
*B23K 9/032* (2006.01)
(Continued)

(52) U.S. Cl.
CPC ................ *B23K 9/04* (2013.01); *B23K 9/032* (2013.01); *B23K 26/342* (2015.10); *B33Y 30/00* (2014.12); *B33Y 50/02* (2014.12)

(58) Field of Classification Search
CPC ........ B23K 9/04; B23K 9/032; B23K 26/342; B33Y 30/00; B33Y 50/02
See application file for complete search history.

(56) References Cited

U.S. PATENT DOCUMENTS 11,229,953 B2 * 1/2022 Blankenship .......... B23K 9/232
11,480,947 B2 * 10/2022 Iriguchi ........... G05B 19/41815
(Continued)

FOREIGN PATENT DOCUMENTS

CN 111037046 A 4/2020
CN 111037051 A 4/2020
(Continued)

OTHER PUBLICATIONS

International Search Report issued in PCT/JP2022/003449; mailed Apr. 12, 2022.

(Continued)

*Primary Examiner* — Lorne E Meade
(74) *Attorney, Agent, or Firm* — Studebaker Brackett PLLC

(57) ABSTRACT

A deposition planning method for an additively manufactured object includes: acquiring shape data; determining a welding path of each layer by slicing a three-dimensional shape of the additively manufactured object into layers; classifying a plurality of welding paths into intersection region paths and constant region paths; dividing the intersection region paths into a lower layer path and an upper layer path of an intersection portion; and determining welding conditions of the intersection region paths such that an upper layer deposit amount is more than a lower layer deposit amount, a sum of the upper layer deposit amount and the lower layer deposit amount is equal to a deposit amount in the constant region paths, and in a cross-section orthogonal to a longitudinal direction of the weld beads formed along the upper layer path, profiles of the weld beads adjacent to each other overlap each other.

9 Claims, 16 Drawing Sheets

(51) Int. Cl.

| | |
|---|---|
| ***B23K 26/342*** | (2014.01) |
| ***B33Y 30/00*** | (2015.01) |
| ***B33Y 50/02*** | (2015.01) |

(56) References Cited

U.S. PATENT DOCUMENTS

| | | | | |
|---|---|---|---|---|
| 11,980,968 | B2 * | 5/2024 | Flamm .................... | B22F 12/00 |
| 2019/0160530 | A1 | 5/2019 | Peters et al. | |
| 2019/0160538 | A1 | 5/2019 | Blankenship et al. | |
| 2019/0160541 | A1 | 5/2019 | Narayanan et al. | |
| 2019/0160542 | A1 | 5/2019 | Narayanan et al. | |
| 2019/0160594 | A1 | 5/2019 | Flamm et al. | |
| 2019/0160595 | A1 | 5/2019 | Narayanan et al. | |
| 2020/0324356 | A1 | 10/2020 | Yamasaki et al. | |
| 2021/0107060 | A1 | 4/2021 | Narayanan et al. | |
| 2023/0286050 | A1 | 9/2023 | Mukai et al. | |

FOREIGN PATENT DOCUMENTS

| | | | |
|---|---|---|---|
| CN | 111344096 | A | 6/2020 |
| JP | 2010-201474 | A | 9/2010 |
| JP | 2019-111582 | A | 7/2019 |
| JP | 2021-016879 | A | 2/2021 |
| WO | 2022/064941 | A1 | 3/2022 |

OTHER PUBLICATIONS

Written Opinion of the International Searching Authority issued in PCT/JP2022/003449; mailed Apr. 12, 2022.

The extended European search report issued by the European Patent Office on Jul. 8, 2024, which corresponds to European Patent Application No. 22755901.0-1103 and is related to U.S. Appl. No. 18/547,142.

* cited by examiner

METHOD FOR PREPARING LAMINATION PLAN

TECHNICAL FIELD

The present disclosure relates to a deposition planning method, a deposition plan making apparatus, and a program for an additively manufactured object formed by depositing weld beads.

BACKGROUND ART

Recently, needs for forming using a 3D printer as a production means have increased, and research and development for the practical use of forming using a metallic material has progressed. The 3D printer that forms a metallic material prepares an additively manufactured object by melting a metal powder and a metal wire using a laser, an electron beam, or a heat source such as an arc and depositing the molten metal. For example, Patent Literature 1 discloses a deposition design method in which, when an additively manufactured object is manufactured by depositing weld beads obtained by melting and solidifying a wire-like metallic material (filler metal), a manufacturing process of the additively manufactured object is evaluated by a simulation, welding paths and welding conditions are adjusted to be optimal, and a welding apparatus is controlled for forming under the adjusted conditions.

CITATION LIST

Patent Literature

Patent Literature 1: JP2010-201474A

Patent Literature 2: JP2019-111582A

SUMMARY OF INVENTION

Technical Problem

Incidentally, when an additively manufactured object is formed by depositing a plurality of weld beads by arc welding, an intersection portion where the weld beads are overlap each other depending on the shape of the additively manufactured object is formed. When the intersection portion is formed, for example, a method of subsequently forming a weld bead B2 with respect to a weld bead B1 in a direction orthogonal to the weld bead B1 as illustrated in FIG. 18 is used, the weld bead B1 being formed in one direction. In this case, the formation of the weld bead B2 is stopped immediately before the previously formed weld bead B1, and the weld bead B2 is formed again from a position after passing the weld bead B1. As a result, an intersection portion CR is formed. However, in this method, a gap is formed between an end edge $B_{end}$ and a start edge $B_{bgn}$ of the weld bead B2, and an internal defect is likely to be generated in the additively manufactured object after forming. In order to suppress the internal defect, it is necessary to set the welding conditions using many tuning parameters.

In addition, in a technique of Patent Literature 2, in a manufacturing process including a contour forming step of forming a contour of an additively manufactured object and a filling pattern welding step of filling the inside of the contour, at an intersection point where the filling pattern encounters the contour, welding conditions change to prevent an amount of a metallic material where the contour is distorted from being welded to the intersection point. Even in this case, the setting of the welding conditions is complicated, and enormous effort is required to form the intersection portion without any problems.

Accordingly, an object of the present disclosure is to provide a deposition planning method, a deposition plan making apparatus, and a program for an additively manufactured object, in which the occurrence of an internal defect in an intersection portion where weld beads intersect with each other can be prevented, and the beads can be formed at a uniform deposition height.

Solution to Problem

The present disclosure has the following configurations.

(1) A deposition planning method for an additively manufactured object, in which the additively manufactured object is formed using shape data representing a three-dimensional shape of the additively manufactured object by an additive manufacturing apparatus that deposits weld beads obtained by melting and solidifying a filler metal, the deposition planning method including:

a step of acquiring the shape data;

a step of determining a plurality of welding paths along which each of layers sliced from the three-dimensional shape of the additively manufactured object represented by the shape data is formed using the weld beads;

a step of classifying the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

a step of dividing each of the intersection region paths into a lower layer path along which a lower layer of the intersection portion is formed and an upper layer path along which an upper layer of the intersection portion is formed; and a step of determining welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other.

(2) A deposition plan making apparatus that makes a deposition plan in which an additively manufactured object is formed using shape data representing a three-dimensional shape of the additively manufactured object by an additive manufacturing apparatus that deposits weld beads obtained by melting and solidifying a filler metal, the deposition plan making apparatus including:

a data acquisition unit configured to acquire the shape data;

a welding path determination unit configured to determine a plurality of welding paths along which each of layers sliced from the three-dimensional shape of the additively manufactured object represented by the shape data is formed using the weld beads;

a welding path classification unit configured to classify the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

an upper and lower layer division unit configured to divide each of the intersection region paths into a lower layer path along which a lower layer of the intersection portion is formed and an upper layer path along which an upper layer of the intersection portion is formed; and a welding condition determination unit configured to determine welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other.

(3) A program causing a computer to execute an additive manufacturing procedure for an additively manufactured object, in which the additively manufactured object is formed using shape data representing a three-dimensional shape of the additively manufactured object by an additive manufacturing apparatus that deposits weld beads obtained by melting and solidifying a filler metal, the additive manufacturing procedure including:

a function of acquiring the shape data;

a function of determining a plurality of welding paths along which each of layers sliced from the three-dimensional shape of the additively manufactured object represented by the shape data is formed using the weld beads;

a function of classifying the plurality of the welding paths in the same layer of each of the layers into intersection region paths corresponding to an intersection portion and constant region paths corresponding to constant portions other than the intersection portion, the intersection portion being fowled by intersection of a portion where a plurality of the weld beads are formed adjacent to each other with another plurality of the weld beads;

a function of dividing each of the intersection region paths into a lower layer path along which a lower layer of the intersection portion is formed and an upper layer path along which an upper layer of the intersection portion is formed; and a function of determining welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other.

Advantageous Effects f Invention

According to the present disclosure, the occurrence of an internal defect in an intersection portion where weld beads intersect with each other can be prevented, and the beads can be formed at a uniform deposition height.

DESCRIPTION OF EMBODIMENTS

Hereinafter, an embodiment of the present disclosure will be described in detail with reference to the drawings.

<Apparatus for Manufacturing Additively Manufactured Object>

Figure 1:
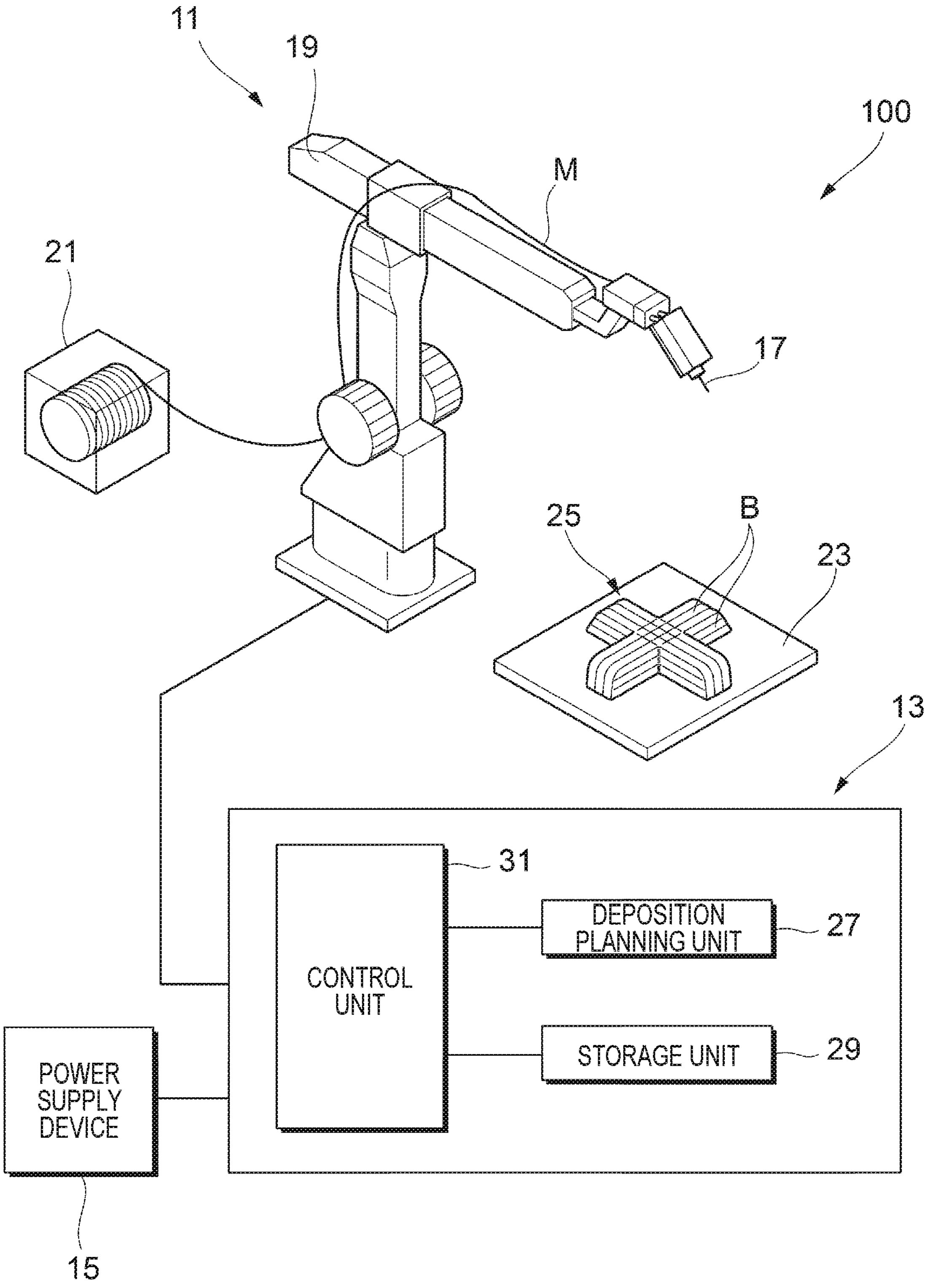
FIG. 1 is a schematic configuration diagram illustrating an apparatus for manufacturing an additively manufactured object.

FIG. 1 is a schematic configuration diagram illustrating an apparatus for manufacturing an additively manufactured object.

A manufacturing apparatus 100 of an additively manufactured object having this configuration includes an additive manufacturing apparatus 11, a controller 13 that comprehensively controls the additive manufacturing apparatus 11, and a power supply device 15. The additive manufacturing apparatus 11 includes a welding robot 19 where a torch 17 is provided at a tip axis, and a filler metal supply unit 21 configured to supply a filler metal (welding wire) M to the torch 17. The additive manufacturing apparatus 11 melts and solidifies the filler metal M by arc welding to form weld beads B on a base plate 23, and sequentially deposits the weld beads B to form an additively manufactured object 25. The manufacturing apparatus 100 of an additively manufactured object described herein has one configuration example and may have another configuration.

The welding robot 19 is an articulated robot, and is supported in the torch 17 attached to a tip axis of a robot arm so that the filler metal M can be continuously supplied. Any position and any posture of the torch 17 can be three-dimensionally set in a range of degree of freedom of the robot arm.

The torch 17 includes a shield nozzle (not illustrated) and is supplied with shielding gas from the shield nozzle. An arc welding method used herein may be any of a consumable electrode type such as shielded metal arc welding and $CO_2$ arc welding or a non-consumable electrode type such as TIG welding and plasma arc welding, and is appropriately selected depending on the additively manufactured object to be prepared.

For example, in the consumable electrode type, a contact tip is disposed in the shield nozzle, and the tiller metal M to which a melting current is supplied is held in the contact tip. The torch 17 generates an arc from a tip of the tiller metal M in a shielding gas atmosphere while holding the filler metal M. The filler metal M is fed from the filler metal supply unit 21 to the torch 17 by a feeding function (not illustrated) attached to the robot arm or the like. When the filler metal M that is continuously fed is melted and solidified while moving the torch 17, the linear weld beads B that is a melt-solidified product of the filler metal M are formed on the base plate 23.

As the filler metal M, various commercially available welding wires can be used. For example, wires defined by solid wires (JIS Z 3312) for MAG and MIG welding of mild steel, high strength steel, and low temperature service steel or flux cored wires (JIS Z 3313) for arc welding. of mild steel, high strength steel, and low temperature service steel can be used.

In addition, a heat source that melts the filler metal M is not limited to the above-described arc, For example, a heat source using another method such as a heating method using an arc and a laser in combination, a heating method using a plasma, or a heating method using an electron beam or a laser may be adopted. When the filler metal M is heated by the electron beam or the laser, the amount of heat can be controlled more finely, and the state of the weld beads can be more accurately maintained, which can contribute to further improvement of the quality of the additively manufactured object.

The controller 13 includes a deposition planning unit 27, a storage unit 29, and a control unit 31 to which these units are connected. The controller 13 is configured by a computer device including a CPU, a memory, and a storage.

The deposition planning unit 27 generates a shape model as a target shape based on three-dimensional shape data (for example, CAD data) of the additively manufactured object to be prepared, and slices the obtained shape model into a plurality of weld bead layers corresponding to the heights of the weld beads B. Regarding each of the sliced layers of the shape model, a deposition plan for determining bead formation paths (trajectories of the torch 17 for forming the weld beads B) and welding conditions for forming the weld beads B (including heating conditions or welding conditions such as a welding current or a welding voltage for obtaining a bead width, a bead deposition height, and the like) is made.

That is, the shape model as the target shape is sliced into a plurality of bead models having shapes corresponding to the weld beads, and the bead formation path and the welding conditions in each of the sliced layers are determined. The made deposition plan is stored in the storage unit 29 as a driving program that drives each of the units of the additive manufacturing apparatus 11.

In the manufacturing apparatus 100 of an additively manufactured object having the above-described configuration, the control unit 31 executes the driving program stored in the storage unit 29 to drive the welding robot 19 and the power supply device 15. That is, the controller 13 drives the welding robot 19 according to a procedure set by the driving program, moves the torch 17 along the bead formation path, heats the filler metal M by an arc at the torch tip, and deposits the molten filler metal M on the base plate 23. As a result, the additively manufactured object 25 where the plurality of weld beads B are formed on the base plate 23 is obtained.

The deposition plan and the driving program may be generated by another computer device different from the controller 13 by inputting required information to the other computer device. In this case, the deposition planning unit 27 is configured by a computer device including a CPU, a memory, and a storage, and the information and the driving program about the made deposition plan are input to the storage unit 29 of the controller 13 through an appropriate communication means such as a LAN.

Figure 2:
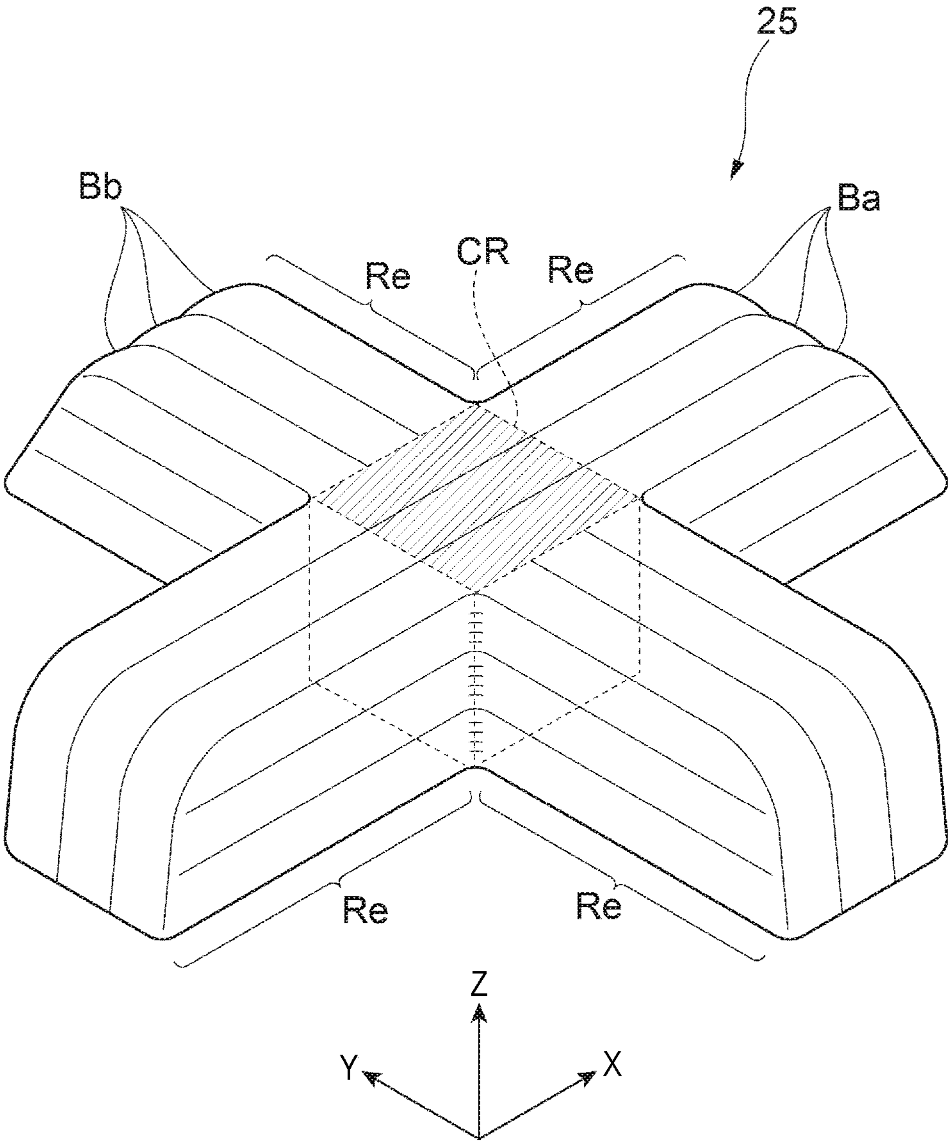
FIG. 2 is a perspective view illustrating a schematic shape of the additively manufactured object including an intersection portion.

FIG. 2 is a perspective view illustrating a schematic shape of the additively manufactured object 25 including an intersection portion.

For example, the additively manufactured object 25 is formed by depositing plural rows (three rows) of weld beads B1 adjacent to each other that are firmed along one direction (X direction) and plural rows (three rows) of weld beads B2 adjacent to each other that are formed along a direction (Y direction) orthogonal to the one direction to form a plurality of layers (three layers) in a height direction (Z direction). A portion (portion surrounded by dotted lines on a bead uppermost layer) where the weld beads B1 and B2 intersect with each other will be referred to as an intersection portion CR, and portions other than the intersection portion CR will be referred to as constant portions RE. An actual additively manufactured object is likely to have a more complicated shape than the above-described shape. Here, the description will be made using the intersection portion CR having a simple shape.

When the deposition plan of the additively manufactured object 25 including the above-described intersection portion CR is made, after forming the weld beads B1 and B2, the deposition height of the intersection portion CR and the deposition height of the constant portion RE match with each other, and the welding conditions of the weld beads are set to suppress the occurrence of an internal defect.

Figure 3:
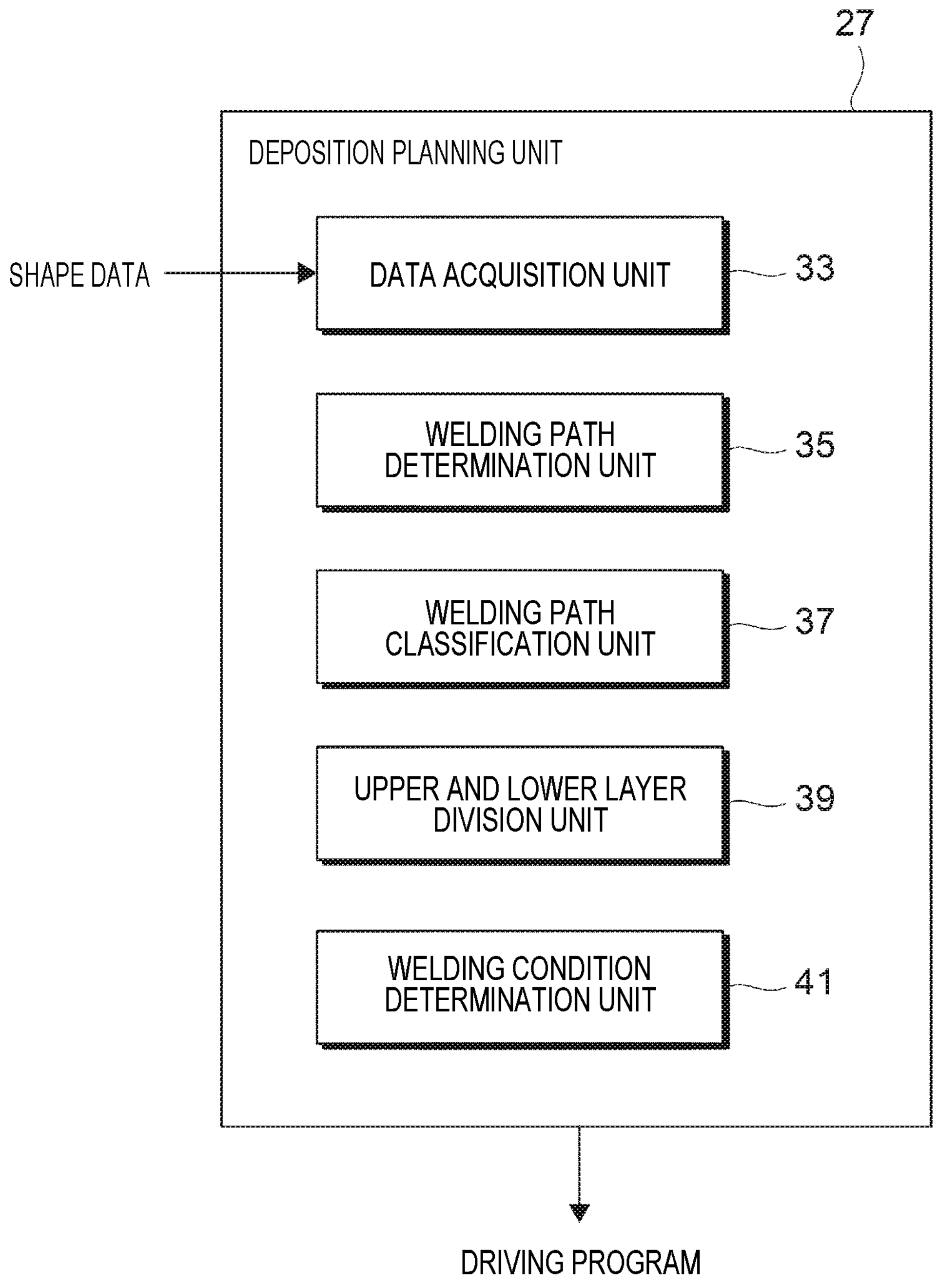
FIG. 3 is a functional block diagram illustrating a deposition planning unit.

FIG. 3 is a functional block diagram of the deposition planning unit 27.

The deposition planning unit 27 includes a data acquisition unit 33, a welding path determination unit 35, a welding path classification unit 37, an upper and lower layer division unit 39, and a welding condition determination unit 41.

The data acquisition unit 33 acquires shape data of the additively manufactured object 25 as a forming target, the welding path determination unit 35 determines a movement trajectory of the torch 17 illustrated in FIG. 1 based on the shape data, the welding path classification unit 37 and the upper and lower layer division unit 39 extracts and adjusts a welding path of the intersection portion CR, and the welding condition determination unit 41 determines welding conditions with respect to the welding path of the intersection portion CR. Accordingly, the obtained deposition plan is output as data including the information about the deposition plan or as the above-described driving program. The details of the processing content of each of the units will be described below.

<Deposition Planning Method>

Hereinafter, a basic deposition plan made by a deposition planning method will be described.

Figure 4A:
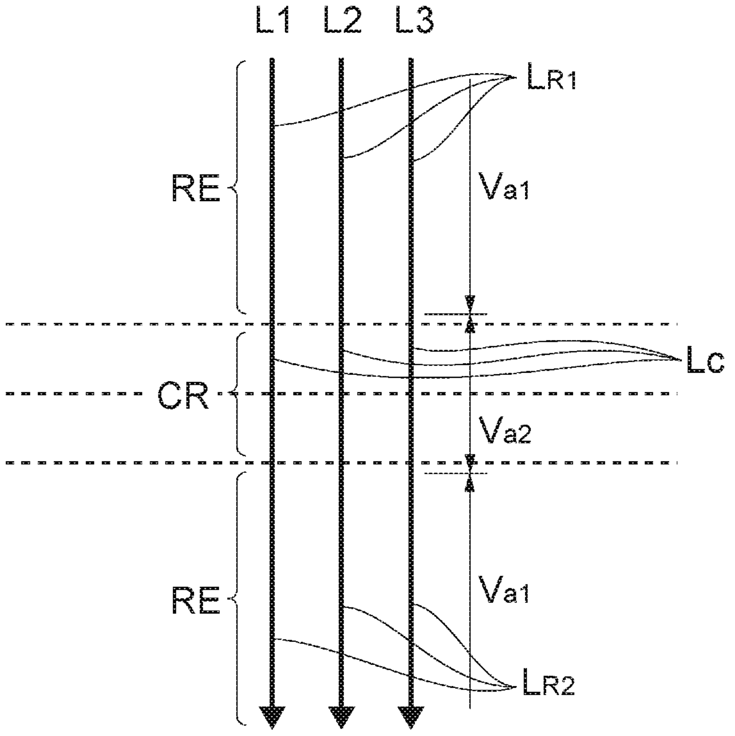
FIGS. 4A and 4B are diagrams illustrating a step of forming the intersection portion using weld beads.
Figure 4B:
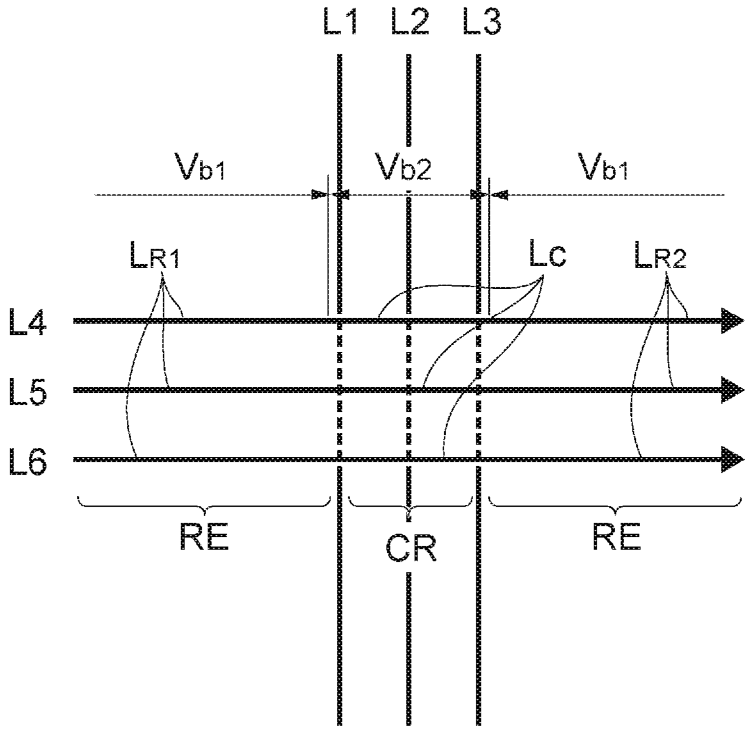

FIGS. 4A and 4B are diagrams illustrating a step of forming the intersection portion using the weld beads.

Here, the deposition plan of the additively manufactured object 25 including the intersection portion CR illustrated in FIG. 2 will be described.

FIG. 4A illustrates welding paths (torch movement trajectories) L1, L2, and L3 in which three rows of the weld beads are formed along one direction. In addition, FIG. 4B illustrates welding paths L4, L5, and L6 in which three rows of the weld beads are formed along a direction orthogonal to the above-described welding paths L1, L2, and L3. The number of the rows of the welding paths is any value and, here, is, for example, three.

Each of the welding paths L1 to L6 can be classified into an intersection portion CR where the weld beads intersect with each other and constant portions RE other than the intersection portion CR, welding paths in the regions of the constant portions RE will be referred to as constant region paths $L_{R1}$ and $L_{R2}$, and a welding path in the region of the intersection portion CR will be referred to as intersection region paths $L_C$.

In the welding paths L1, L2, and L3 illustrated in FIG. 4A, a welding rate $V_{a2}$ in the intersection region paths $L_C$ is faster than a welding rate $V_{a1}$ in the constant region paths $L_{R1}$ up to the intersection portion CR and in the constant region paths $L_{R2}$ after passing the intersection portion CR ($V_{a1}<V_{a2}$).

In addition, in the welding paths L4, L5, and L6 illustrated in FIG. 4B, likewise, a welding rate $V_{b2}$ in the intersection region paths $L_C$ is faster than a welding rate $V_{b1}$ in the constant region paths $L_{R1}$ up to the intersection portion CR and in the constant region paths $L_{R2}$ after passing the intersection portion CR ($V_{b1}<V_{b2}$).

When the welding rate increases, the deposit amount per unit length of the formed weld beads decreases, and thus the height of the weld beads decreases. Using this configuration, the welding rate is adjusted such that the sum of the deposit amounts in the intersection region paths $L_C$ of the welding paths L1, L2, and L3 and in the intersection region paths $L_C$ of the welding paths L4, L5, and L6 is equal to the deposit amounts in the constant region paths $L_{R1}$ and $L_{R2}$. As a result, the total height of the weld beads formed along the intersection region paths $L_C$ of the welding paths L1, L2, and L3 and the intersection region paths $L_C$ of the welding paths L4, LS, and L6 that vertically overlap each other is equal to the heights of the weld beads formed in the constant portions RE.

Figure 5:
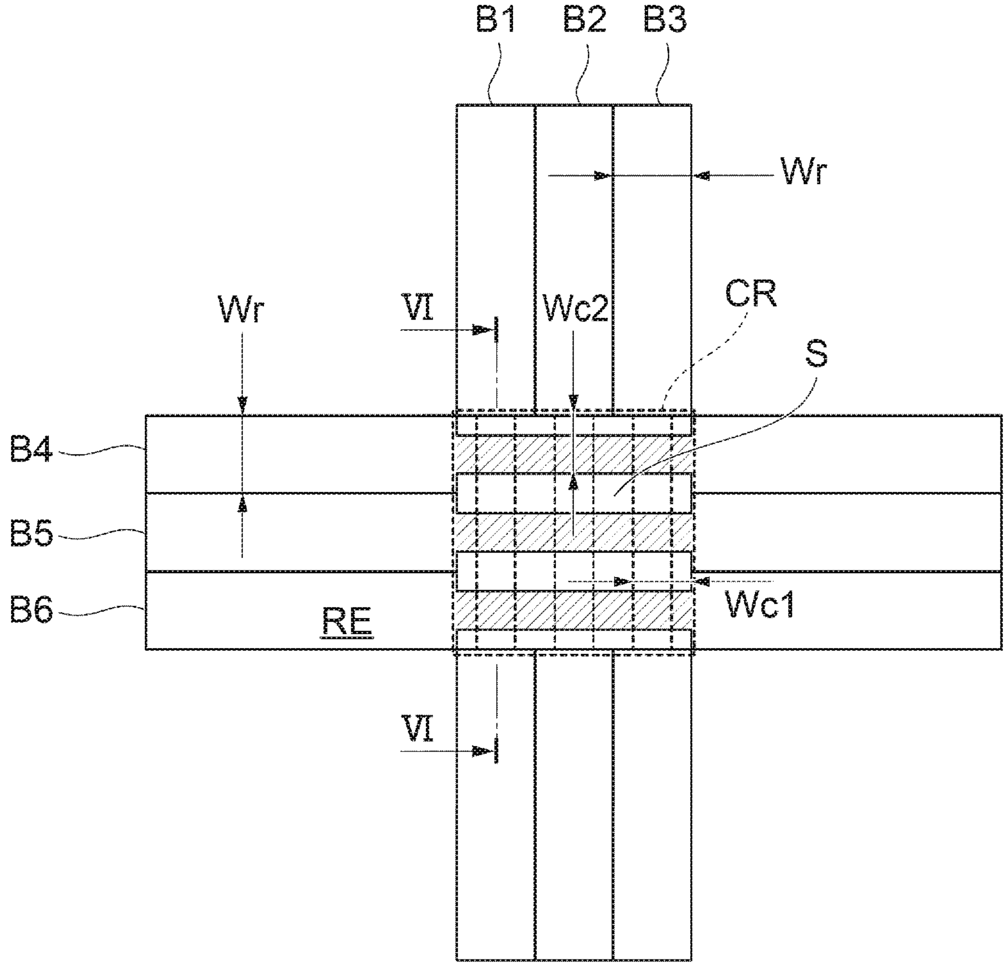
FIG. 5 is a reference diagram illustrating a state where the weld beads are formed along intersection region paths under the same conditions in an upper layer and a lower layer of the intersection portion.

FIG. 5 is a reference diagram illustrating a state where the weld beads are formed along intersection region paths under the same conditions in an upper layer and a lower layer of the intersection portion CR.

As illustrated in FIG. 5, in the intersection portion CR, the intersection region paths $L_C$ of the welding paths L1, L2, and L3 that are previously formed as illustrated in FIG. 4A serve as a lower layer path, and weld heads B1, B2, and B3 are formed. In addition, the intersection region paths $L_C$ of the welding paths L4, L5, and L6 that are subsequently formed as illustrated in FIG. 4B serve as an upper layer path, and weld beads B4, B5, and B6 are formed.

However, as illustrated in FIG. 5, when the sum of the deposit amounts in the lower layer path and the upper layer path is adjusted to be equal to the deposit amount in the constant region paths and the welding rate of the lower layer path and the welding rate of the upper layer path in the intersection portion CR are adjusted to be equal to each other, each of the deposit amounts in the lower layer path and the upper layer path is ½ that in the constant region paths. In this case, a bead width $W_{C1}$ of the weld bead formed along the lower layer path and a bead width $W_{C2}$ of the weld bead formed along the upper layer path are less than a bead width Wr of the weld bead formed along the constant region paths, and a gap S where no weld bead is formed is generated in the region of the intersection portion CR.

Figure 6:
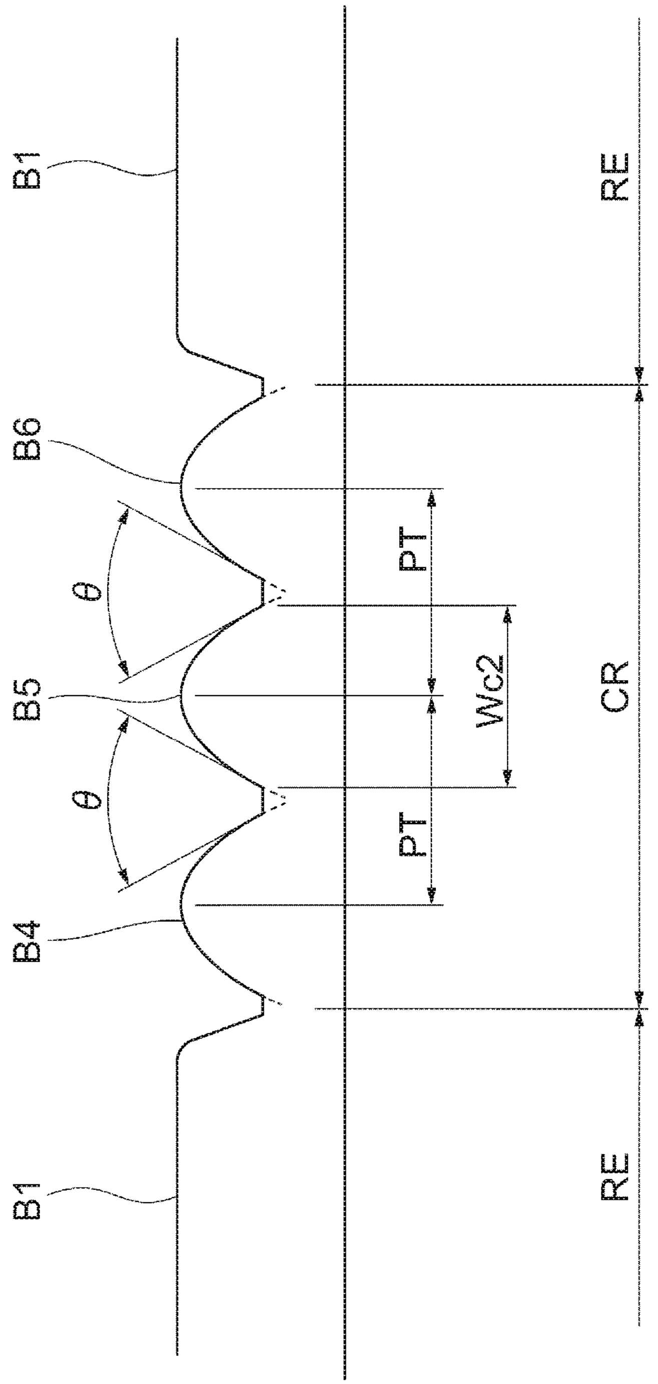
FIG. 6 is a reference diagram illustrating a cross-section of the weld heads taken along line VI-VI illustrated in FIG. 5.

FIG. 6 is a reference diagram illustrating a cross-section of the weld beads taken along line VI-VI illustrated in FIG. 5.

As illustrated in FIG. 6, the weld beads B4, B5, and B6 formed along the upper layer path are formed on the weld bead B1 formed along the lower layer path. All of the bead widths $W_{C2}$ of the weld beads B4, B5, and B6 are narrower than a pitch width PT of a bead center, and an angle θ of a valley portion fowled between the weld beads adjacent to each other due to undulation of the beads decreases. This way, the undulation of the weld beads B4, B5, and B6 formed along the upper layer path is formed to rise on a steep slope from the weld head B1 of the lower layer, and unevenness on a bead surface is deep.

Figure 7:
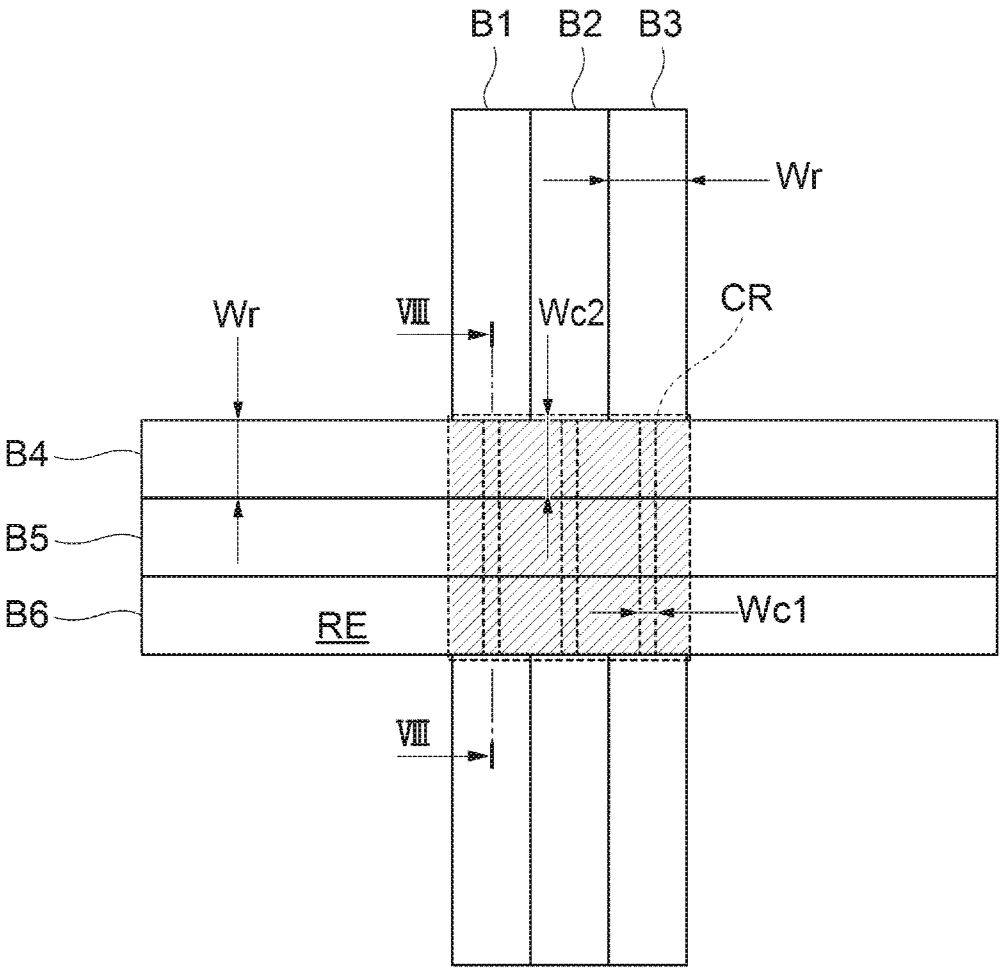
FIG. 7 is a diagram illustrating a state where the weld beads are formed along the intersection region paths under different conditions in the upper layer and the lower layer of the intersection portion.

FIG. 7 is a diagram illustrating a state where the weld beads are formed along the intersection region paths under different conditions in the upper layer and the lower layer of the intersection portion CR.

As illustrated FIG. 7, while the sum of the deposit amounts in the lower layer path and the upper layer path is adjusted to he equal to the deposit amount in the constant region paths, the welding rate of the upper layer path in the intersection portion CR is adjusted to be slower than the welding rate of the lower layer path. As a result, in the intersection portion CR, the bead width $W_{C1}$ of the weld beads B1, B2, and B3 that are previously formed is narrower than the bead width $W_{C1}$ illustrated in FIG. 5. In addition, the bead width $W_{C2}$ of the weld beads B4, B5, and B6 that are subsequently formed is wider than the bead width $W_{C2}$ illustrated in FIG. 5, and the weld beads adjacent to each other overlap each other.

Figure 8:
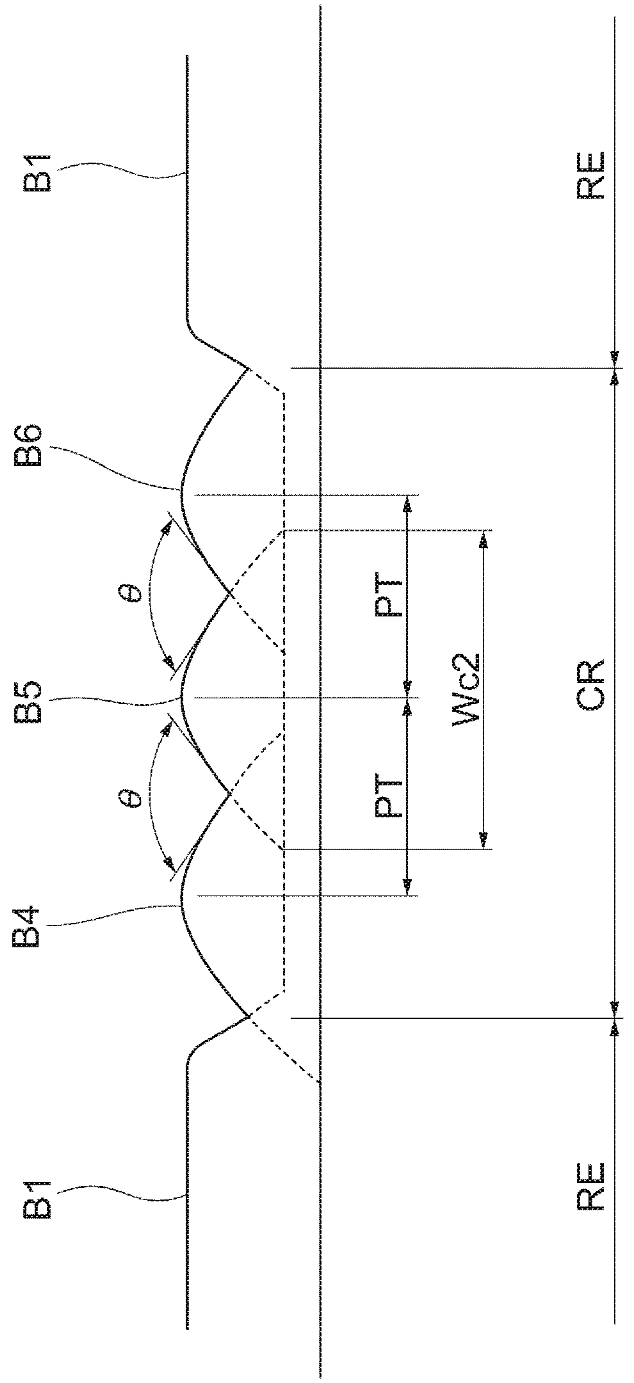
FIG. 8 is a cross-sectional view of the weld beads taken along line VIII-VIII illustrated in FIG. 7.

FIG. 8 is a cross-sectional view of the weld beads taken along line VIII-VIII illustrated in FIG. 7.

As illustrated in FIG. 8, in the weld bead B1 formed along the lower layer path, the welding rate is fast, and thus the head height is low. All of the head widths $W_{C2}$ of the weld beads B4, B5, and B6 formed along the upper layer path are wider than the pitch width PT of the bead center, and the undulation of the beads is gentle. As a result, the weld beads adjacent to each other overlap each other on the weld bead B1, and the angle θ of the formed valley portion is more than that illustrated in FIG. 6. This way, the undulation of the weld beads B4, B5, and B6 formed along the upper layer path is formed to rise on a gentle slope from the weld bead B1 of the lower layer, and the unevenness on the bead surface is shallow. That is, the weld bead formed along the upper layer path is formed on the weld bead formed along the lower layer path without a gap.

Next, the welding conditions will be described in more detail.

A deposit amount S of the weld bead is represented by Expression (1).

[Numeral 1]

$$S = \frac{V_{Wire}\pi r^2 \mu}{V_{weld}} \tag{1}$$

S: deposit amount (deposit volume per unit length [1 mm])

$V_{wire}$: feeding rate of filler metal [m/min]

$V_{weld}$: welding rate [cm/min]

r: filler metal radius [mm]

μ: weld ratio (typically 1 to 0.98)

The welding conditions of the constant portion can be set, for example, as follows.

$V_{wire}$: 5.2 [m/min]

$V_{weld}$ ($V_{a1}$, $V_{b1}$): 74 [cm/min]

S: 7.8 [$mm^3$]

In the intersection portion CR, it is preferable that the deposit amount of the weld bead formed along the lower layer path is as small as possible. Accordingly, when the welding rate $V_{weld}$ is set to 300 [cm/min] which is a maximum movement speed of the robot that supports the torch, a deposit amount (lower layer deposit amount) S1 of the weld bead formed along the lower layer path is 1.9 $mm^3$. In addition, in order to adjust the deposit amount of the intersection portion CR to be equal to the deposit amount of the constant portion RE, a deposit amount (upper layer deposit amount) S2 of the weld bead formed along the upper layer path is 7.8-1.9=5.9 $mm^3$ when calculated from Expression (2).

$$S2=S-S1 \tag{2}$$

In this case, when the welding conditions of the upper layer path are converted and acquired, assuming that the feeding rate of the filler metal is 5.2 [m/min], the welding rate is 97 [cm/min].

In order to make the surface texture of the weld bead uniform, the bead width of the weld bead formed along the upper layer path needs to be controlled not to change as far as possible. Therefore, it is preferable that a ratio S1/(S1+S2) of the deposit amounts is as low as possible. In order to set a threshold (upper limit value) for the ratio S1 (S1+S2), for example, a value where a defect starts to occur between the weld beads adjacent to each other may be set as the threshold.

Here, it is considered that, in the intersection portion CR of the weld beads, three rows of weld beads that intersect with each other are formed. As illustrated in FIG. 5, when the upper layer deposit amount S2 of the weld beads B4, B5, and B6 formed along the upper layer path is small, a change in the welding rate $V_{weld}$ when entering the intersection portion CR from the constant portion RE is large (when the welding rate $V_{weld}$ of the constant portion is 74 [cm/min], the welding rate V weld of the intersection portion is 150 [cm/min]). Therefore, the bead width of the intersection portion CR is less than the bead width of the constant portion RE.

In addition, since the distance between weld beads adjacent to each other does not change, the undulation between the beads increases, and the angle θ between the valleys decreases. When the angle θ between the valleys decreases, a thin, deep, and narrow portion is formed, and when the weld bead is continuously deposited on the narrow portion, the narrow portion remains as an internal defect without being melted.

On the other hand, as illustrated in FIG. 7, by reducing a difference between the upper layer deposit amount S2 of the weld beads B4, B5, and B6 formed along the upper layer path and the deposit amount of the constant portion RE, a change in the bead width of the weld beads B4, B5, and B6 formed along the upper layer path is small, and the weld bead having substantially the same shape as that of the constant portion RE is formed. Therefore, an internal defect is not likely to occur without the occurrence of the thin, deep, and narrow portion. In this configuration, the angle θ between the valleys may be set to be an angle exceeding 40° preferably an angle exceeding 50°, and more preferably an angle exceeding 60°. The desired angle θ changes depending on various conditions such as a material or a shape of the manufactured object.

As described above, by selling limited tuning parameters such as the welding rate based on the condition of the deposit amount, forming where the occurrence of an internal defect is prevented can be performed, and deposition conditions for the intersection portion where there are no problems can be easily set.

Figure 9:
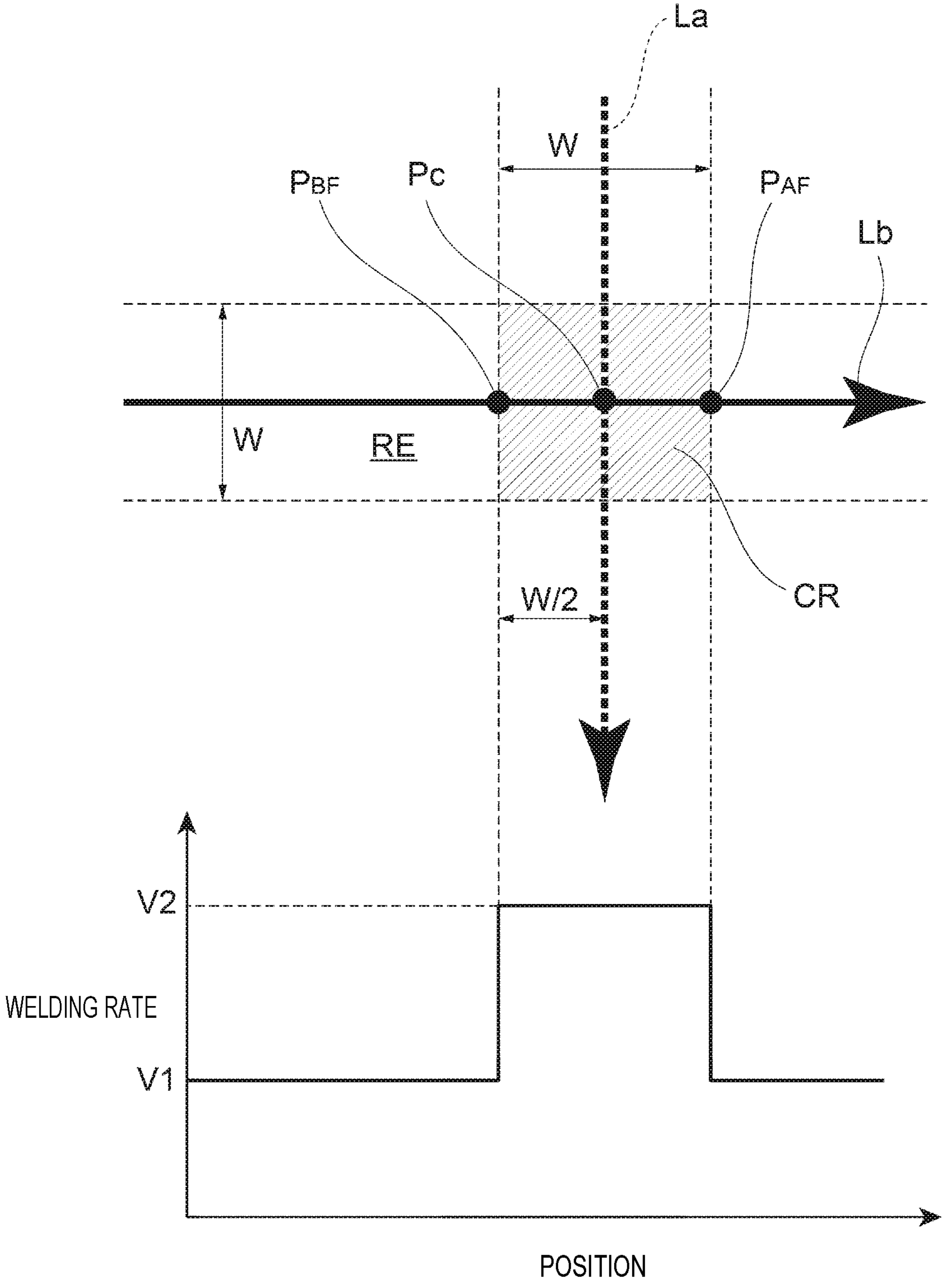
FIG. 9 is a diagram illustrating a change timing of a welding rate in the intersection portion.

FIG. 9 is a diagram illustrating a change timing of the welding rate in the intersection portion.

When the intersection portion CR of the weld beads is formed along one welding path La and another welding path Lb intersecting with the welding path La, an intersection point Pc between the welding path La and the welding path Lb is acquired from coordinate information of the welding paths. In addition, a bead width W of the weld bead formed along the welding path La is acquired from the above-described information such as the deposit amount.

Here, the intersection portion CR is in a range of a bead width W/2 centering on the intersection point Pc in front of and behind a welding direction along the welding paths La and Lb. In the intersection portion CR, the welding rate in the intersection region paths $L_C$ is changed from a welding rate V1 to a welding rate V2 in the constant region path. That is, a timing at which the welding rate starts to change is a timing of reaching the intersection portion CR from the constant portion RE in the welding path Lb, that is, a position $P_{BF}$ moved back from the intersection point Pc by a distance of W/2. In addition, a timing at which the welding rate returns to the welding rate V1 of the constant region path is a position $P_{AF}$ moved forward from the intersection point Pc by a distance of W/2. As in the welding path La, the welding rate is set to the welding rate V in a range from the position moved back from the intersection point Pc along the welding path La by a distance of W/2 to the position moved forward from the intersection point Pc along the welding path La by a distance of W/2.

This way, by setting the position where the welding rate changes to the position at the distance that is ½ of the bead width W from the intersection point Pc, local excess and deficiency in deposit amount in the vicinity of the rate change point can he resolved. Accordingly, the weld bead can be formed in a smooth shape without local unevenness of the additively manufactured object.

<Procedure of Making Deposition Plan>

Next, a procedure of making the deposition plan where the bead formation paths and the welding conditions for forming the additively manufactured object are set will be described in detail.

Figure 10:
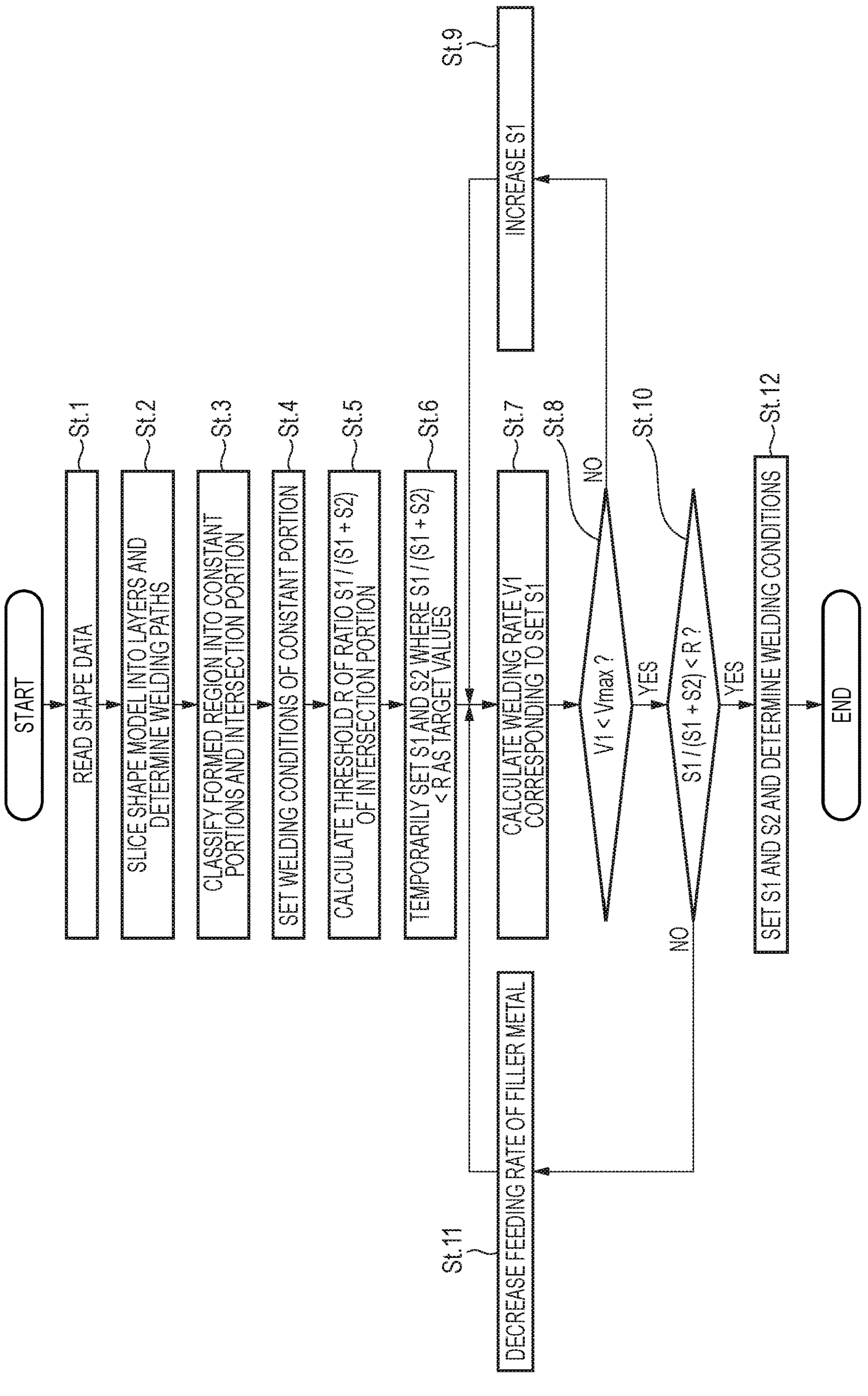
FIG. 10 is a flowchart illustrating a procedure of making a deposition plan.

FIG. 10 is a flowchart illustrating the procedure of making the deposition plan. Here, the deposition plan is made by the deposition planning unit 27 illustrated in FIG. 3.

First, the data acquisition unit 33 reads three-dimensional shape data representing a target shape of the additively manufactured object to be prepared (St. 1).

The welding path determination unit 35 generates a three-dimensional shape model based on the acquired shape data, and slices the obtained shape model into layers obtained by forming the weld beads once. That is, the shape model is sliced into a plurality of layers corresponding to the heights of the weld beads B. Regarding each of the obtained plurality of layers, welding paths that are trajectories of the torch 17 (FIG. 1) for forming the weld beads are determined (St. 2).

Next, the welding path classification unit 37 classifies the plurality of welding paths in the same layer of each of the sliced layers into the intersection region paths and the constant region paths corresponding to constant portions other than the intersection portion (St. 3).

Regarding each of the welding paths classified into the constant region paths, the welding condition determination unit 41 sets welding conditions for forming the weld beads (conditions including heating conditions such as a welding current or a welding voltage for obtaining a desired bead width and a desired bead deposition height, a filler metal feeding rate, and the like) (St. 4).

On the other hand, the welding paths classified into the intersection region paths are divided by the upper and lower layer division unit 39 into a lower layer path along which a lower layer of the intersection portion is formed and an upper layer path along which an upper layer of the intersection portion is formed, and the welding conditions are set by the welding condition determination unit 41. Specifically, first, for a ratio between a lower layer deposit amount S1 per unit length of the weld beads formed along the lower layer path and an upper layer deposit amount S2 per unit length of the weld beads formed along the upper layer path, specifically, for a ratio S1/(S1+S2) of the deposit amounts, a threshold R that is a limit value where a defect does not occur is determined by determining whether or not a defect occurs by a simulation or an experimental measurement (St. 5).

When the threshold R is determined, as a specific index, in a cross-section orthogonal to a longitudinal direction of the weld beads, the angle θ of the valley portion formed between the weld beads adjacent to each other due to the undulation of the plurality of weld beads formed along the upper layer path may be used. This formed shape may be experimentally obtained by actual forming. However, the angle θ of the valley portion can also be analytically predicted with a sufficient accuracy by setting the cross-sectional shape of the weld beads to a simple shape such as a trapezoidal model.

In addition, as described above, assuming that the limit value of the angle θ of the valley portion is, for example, 40°, a limit ratio S1/(S1+S2) of limit deposit amounts where the angle θ is 40° or more may be obtained as the threshold R. The threshold R may be determined using, for example, table information regarding the occurrence of a defect that is obtained in advance before additive manufacturing.

The lower layer deposit amount S1 and the upper layer deposit amount S2 may be temporarily set such that the sum of the lower layer deposit amount S1 and the upper layer deposit amount S2 is equal to a deposit amount per unit length of the weld beads formed along the constant region path and the ratio S1/(S1+S2) of the deposit amounts is the predetermined threshold R or less (St. 6). It can be seen that, under welding conditions where the ratio S1/(S1+S2) of the deposit amounts is the threshold R or less, as illustrated in FIG. 8, in a cross-section orthogonal to a longitudinal direction of the weld heads formed along the upper layer path, profiles of the weld beads adjacent to each other overlap each other.

Next, based on the temporarily set ratio of the deposit amounts, the welding rate V2 (refer to $V_{a2}$ and $V_{b2}$ illustrated in FIG. 4A) of the weld beads formed along the lower layer path is calculated (St. 7). Whether or not the calculated welding rate V2 is a maximum rate $V_{max}$ or less that can be implemented by a welding robot is determined ($V2 \leq V_{max}$) (St. 8).

When the welding rate V2 exceeds the maximum rate $V_{max}$, the lower layer deposit amount S1 is increased (St. 9), and the process restarts from Step St. 7. When the welding rate V2 is the maximum rate $V_{max}$ or lower, whether or not the ratio S1/(S1+S2) of the deposit amounts is the threshold R or less is determined (St. 10). When the ratio S1/(S1+S2) of the deposit amounts exceeds the threshold R, the feeding rate $V_{wire}$ of the filler metal is decreased (St. 11), and the process restarts from Step St. 7. When the ratio S1/(S1+S2) of the deposit amounts is the threshold R less, the lower layer deposit amount S1 and the upper layer deposit amount S2 that are temporarily set are fixed, and welding conditions corresponding to S1 and S2 are determined (St. 12).

<Verification of Ratio of Deposit Amounts>

Here, regarding samples formed with various ratios S1/(S1+S2), whether forming is good or bad was determined.

FIGS. 11 to 15 are diagrams illustrating prediction profiles of weld beads in upper layers and lower layers of intersection portions of samples 1 to 5. The ratio S1/(S1+S2), the welding rate, and the determination result of whether or not forming is good or bad of each of the samples 1 to 5 are collectively shown in Table 1.

TABLE 1

| | Layer | | | |
|---|---|---|---|---|
| | Ratio S1/(S1 + S2) | Lower Layer Welding Rate [cm/min] | Upper Layer Welding Rate [cm/min] | Good or Bad Determination |
| Sample 1 | 0.24 | 300 | 97 | ○ |
| Sample 2 | 0.35 | 210 | 113 | ○ |
| Sample 3 | 0.38 | 190 | 120 | ○ |
| Sample 4 | 0.41 | 180 | 125 | X |
| Sample 5 | 0.50 | 150 | 150 | X |

Figure 11:
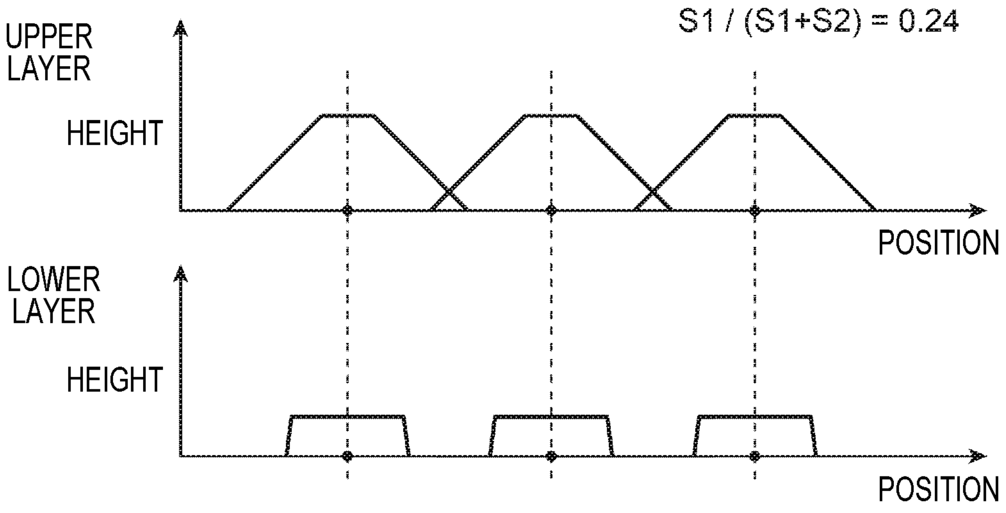
FIG. 11 is a diagram illustrating prediction profiles of weld heads in an upper layer and a lower layer of an intersection portion of a sample 1.
Figure 12:
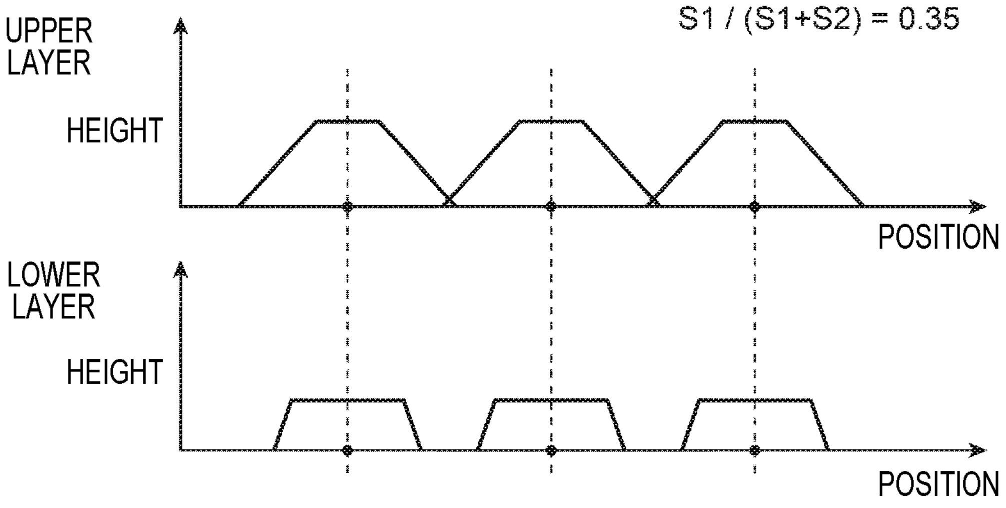
FIG. 12 is a diagram illustrating prediction profiles of weld beads in an upper layer and a lower layer of an intersection portion of a sample 2.
Figure 13:
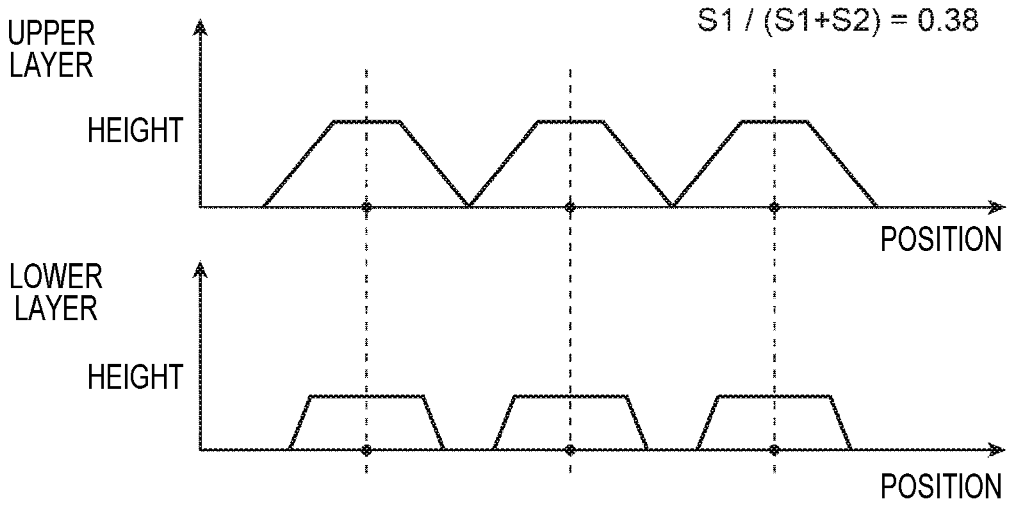
FIG. 13 is a diagram illustrating prediction profiles of weld beads in an upper layer and a lower layer of an intersection portion of a sample 3.
Figure 14:
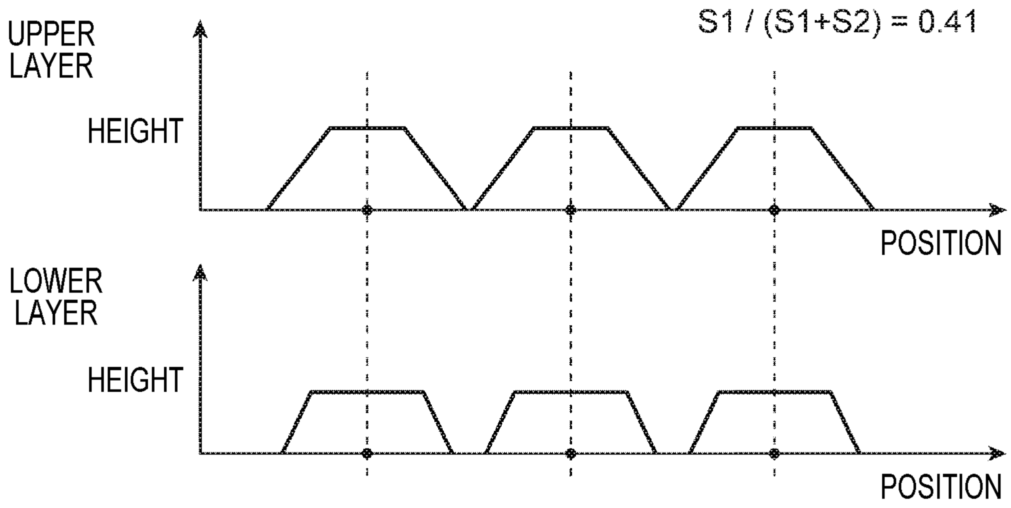
FIG. 14 is a diagram illustrating prediction profiles of weld beads in an upper layer and a lower layer of an intersection portion of a sample 4.
Figure 15:
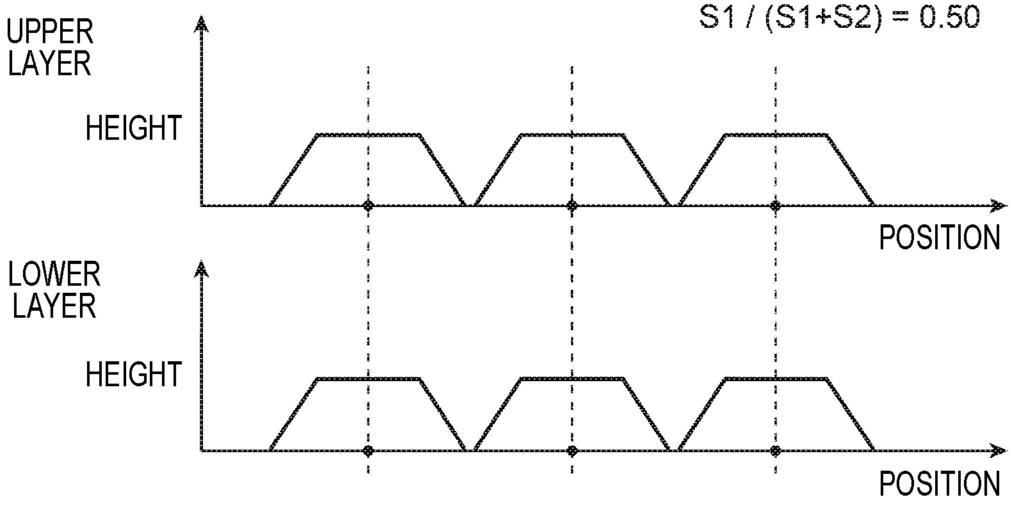
FIG. 15 is a diagram illustrating prediction profiles of weld beads in an upper layer and a lower layer of an intersection portion of a sample 5.

The weld beads of the upper layer of each of the samples 1 to 3 illustrated in FIGS. 11 to 13 include an overlapping portion where beads adjacent to each other overlap each other on the weld beads of the lower layer. On the other hand, in the weld beads of the upper layer of each of the samples 4 and 5 illustrated in FIGS. 14 and 15, the overlapping portion is not formed on the weld beads of the lower layer.

It can be determined from the above results that, when the ratio S1/)S1+S2) in the samples 1 to 3 is 0.4 or less, a welding defect does not occur, and it can be determined from the above results that, when the ratio S1/(S1+S2) in the samples 4 and 5 exceeds 0.4, a gap is generated between the weld beads of the upper layer such that an internal defect may occur. This way, when various conditions such as a material or a shape of the manufactured object are determined, a limit value of the ratio where an internal defect may occur is acquired.

<Other Setting Examples of Welding Rate>

Figure 16:
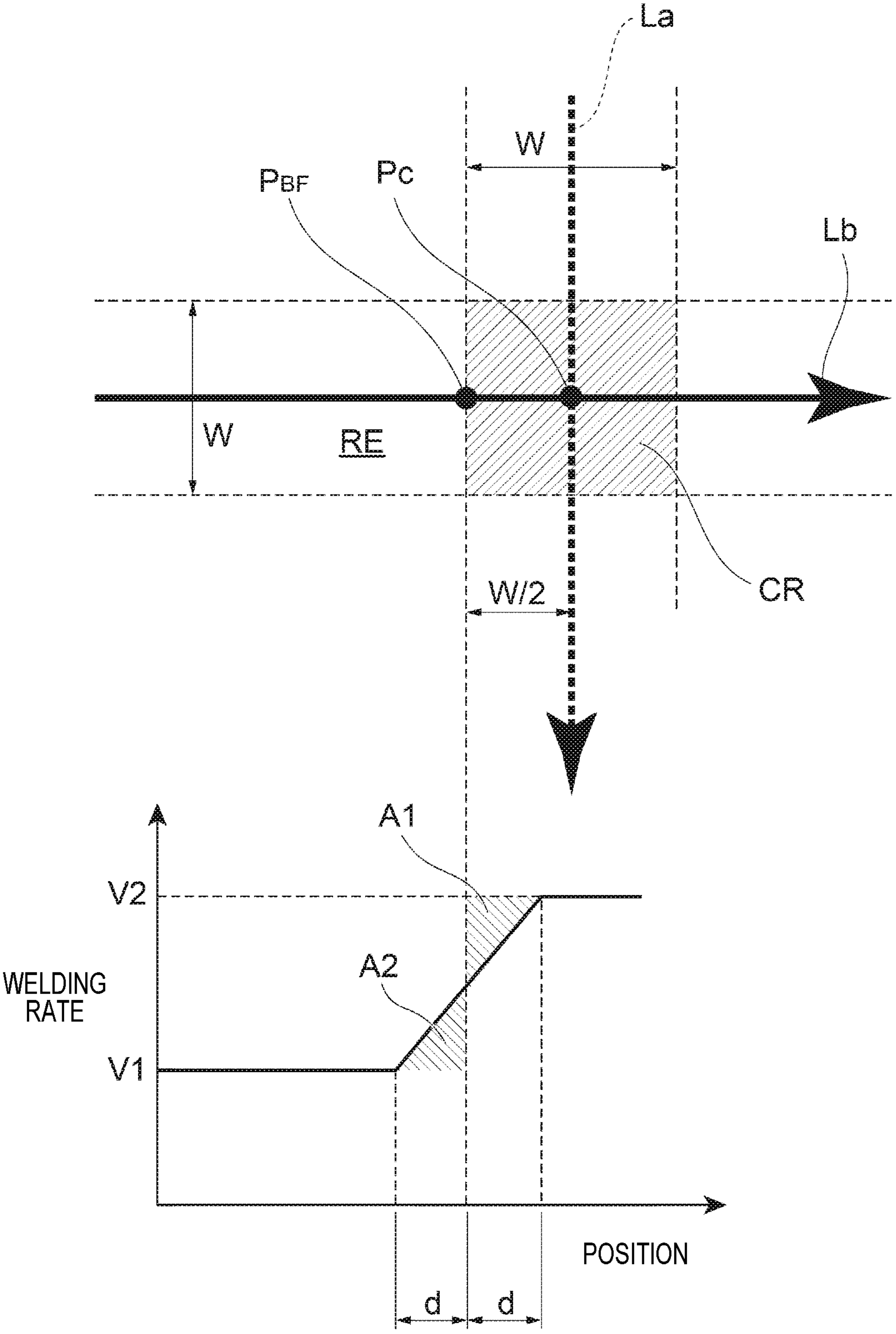
FIG. 16 is a diagram illustrating another change timing of the welding rate in the intersection portion.

FIG. 16 is a diagram illustrating another change timing of the welding rate in the intersection portion.

Weld beads are formed along one welding path La and another welding path Lb intersecting with the welding path La. At this time, a position moved back from the intersection point Pc between the welding path La and the welding path Lb along the welding path La by a distance that is ½ of the bead width W of the weld bead formed along the welding path La is represented by $P_{BF}$. The welding rate changes with this position $P_{BF}$ as a center position in a range from a change start point to a change end point of the welding rate.

That is, the welding rate is gradually increased from V1 of the constant region path to V2 of the intersection region path such that the areas of diagonally hatched triangles A1 and A2 having a width d centering on the position $P_{BF}$ in FIG. 16 are equal to each other. The width d is set in a range of 0<d≤W/2. This way, by changing the welding rate in a range of ±d centering on the position moved back from the intersection point Pc along the welding path Lb by the distance that is ½ of the bead width W, the widths of the weld beads to be formed can be easily made uniform, and a uniform bead width can be stably obtained. In addition, even when the welding rate returns to V1 from V2, the welding rate may change in a range of ±d centering on a position moved forward along the welding path Lb by the distance that is ½ of the bead width W.

<Formation of Intersection Portion Using Only Weld Beads of Upper Layer>

In the above-described additive manufacturing procedure, the intersection portion is formed by causing the weld beads of the lower layer and the weld beads of the upper layer to overlap each other. However, the intersection portion may be formed using only the weld beads of the upper layer by stopping the formation of the weld beads of the lower layer while keeping the welding path continuous.

For example, in a period of the intersection region paths $L_C$ of the welding paths L1, L2, and L3 illustrated in FIG. 4A, the formation of the weld beads of the lower layer is stopped by setting the feeding rate of the filler metal in the lower layer path to 0 to stop the supply of the filler meal. At a position where the bead formation is stopped, the weld beads are formed along the upper layer path by setting welding conditions such that the deposit amount thereof is equal to the deposit amount of the weld bead of the constant region path.

At this time, it is preferable that, at the time of restart after temporarily stopping the formation of the weld beads along the lower layer path, the feeding rate of the filler metal is controlled in synchronization with the change in the welding rate.

Figure 17A:
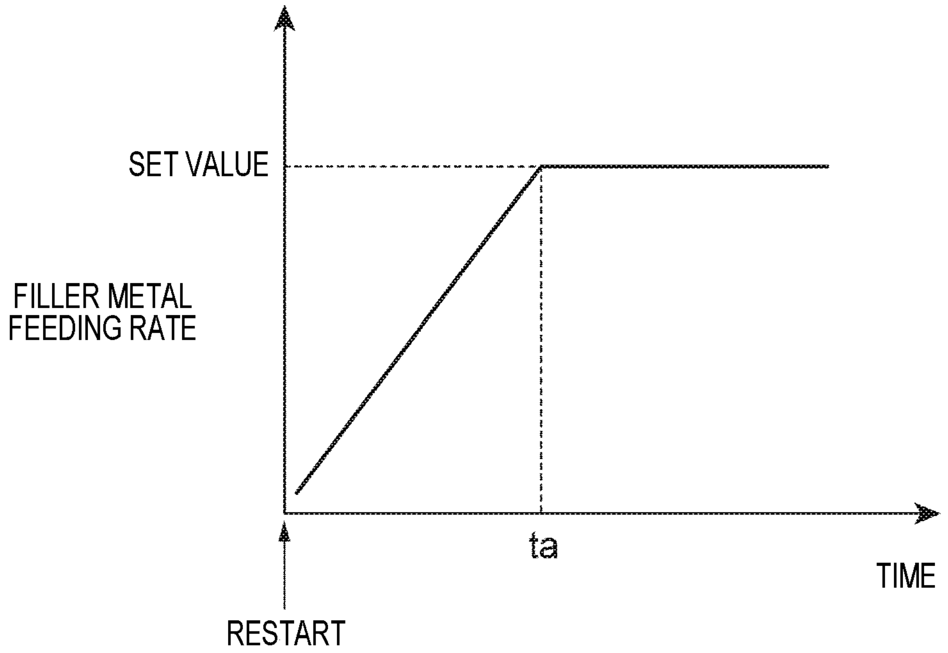
FIGS. 17A and 17B are graphs illustrating a relationship between a feeding rate of a filler metal and a welding rate at the time of restart from the stop of the formation of the weld beads in the lower layer.
Figure 17B:
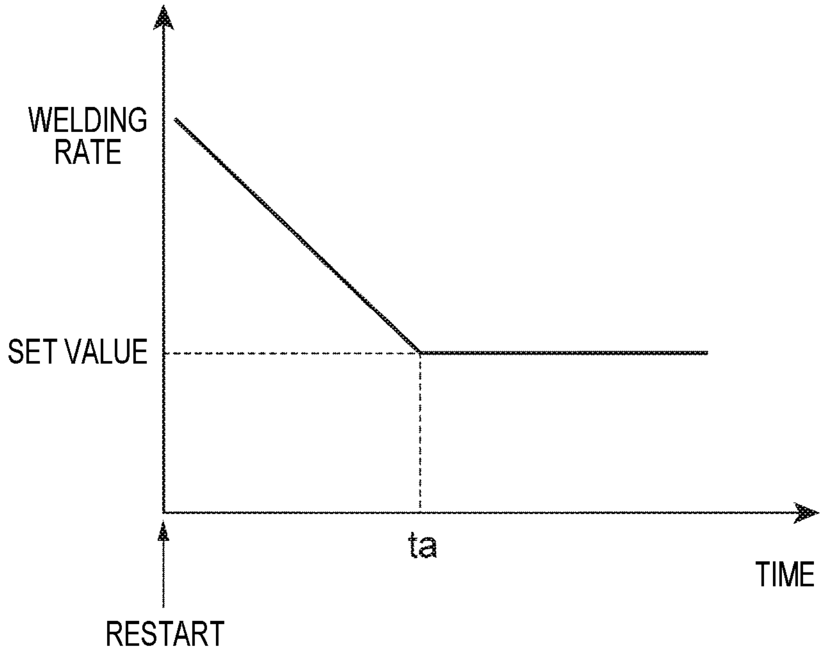
Figure 18:
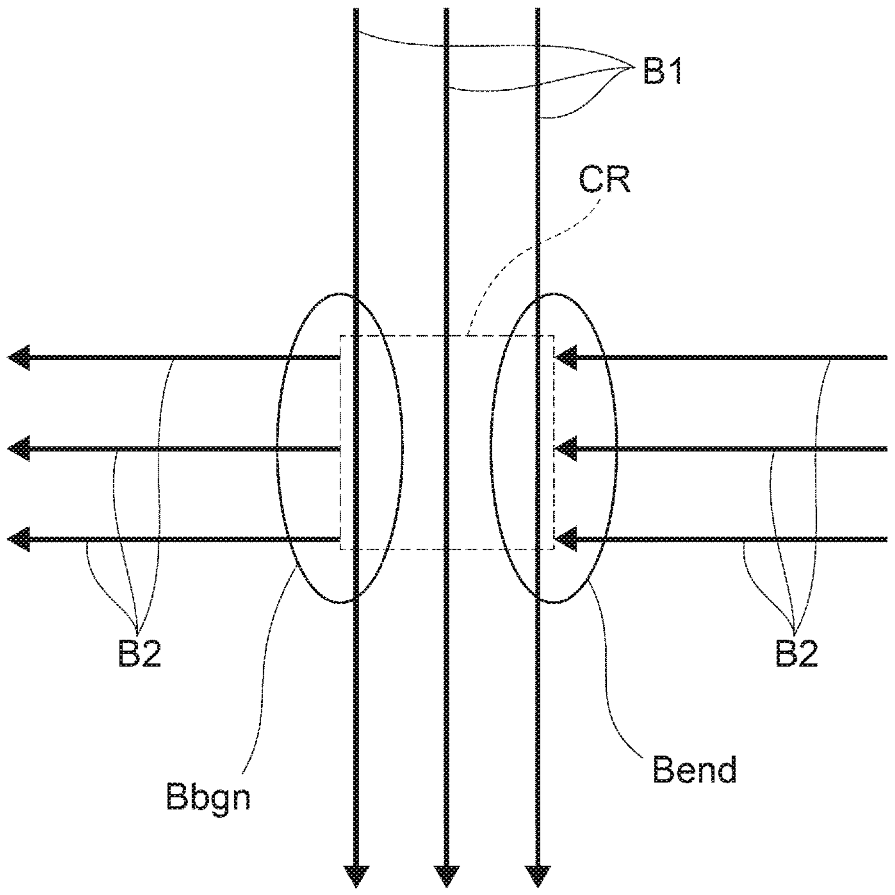
FIG. 18 is a diagram illustrating a procedure of forming an intersection portion of weld beads in the related art.

FIGS. 17A and 17B are graphs illustrating a relationship between the feeding rate of the filler metal and the welding rate at the time of the restart from the stop of the formation of the weld beads in the lower layer.

As illustrated in FIG. 17A, the feeding rate of the filler metal is 0 at the time of the restart but is gradually increased to a set feeding rate until time ta. Along with the gradual increase in the feeding rate, the welding rate is gradually decreased as illustrated in FIG. 17B. That is, the welding rate is increased in the lower layer path at the time of the restart but is gradually decreased to the set welding rate in the constant region path until time ta. As a. result, in the period from the restart to time ta, the welding rate is decreased while increasing the feeding rate of the filler metal. Therefore, the supply amount of the filler metal per unit length is uniform, and uniform weld beads can be formed.

The deposit amount may be maintained to be as small as possible while causing the torch to generate a minimum arc without completely stopping the formation of the weld beads along the lower layer path. Even in this case, a state close to a case where the formation of the weld beads of the lower layer is substantially completely stopped is obtained.

The present disclosure is not limited to the above-described embodiment, and combinations of the configurations of the embodiment and changes and applications based on the description of the specification and well-known techniques by those skilled in the art can be expected from the present disclosure and are included in the range for which protection is sought.

As described above, the present specification discloses the following features.

(1) A deposition planning method for an additively manufactured object, in which the additively manufactured object is formed using shape data representing a three-dimensional shape of the additively manufactured object by an additive manufacturing apparatus that deposits weld beads obtained by melting and solidifying a filler metal, the deposition planning method including:

a step of acquiring the shape data;

a step of determining a plurality of welding paths along which each of layers sliced from the three-dimensional shape of the additively manufactured object represented by the shape data is formed using the weld beads;

a step of classifying the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

a step of dividing each of the intersection region paths into a lower layer path along which a lower layer of the intersection portion is formed and an upper layer path along which an upper layer of the intersection portion is formed; and a step of determining welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other.

In the deposition planning method of an additively manufactured object, the intersection region paths are divided into the upper layer path and the lower layer path, and the welding conditions are set for each of the paths. The deposition plan can be easily made, in which the occurrence of an internal defect in the intersection portion where the weld beads intersect with each other can be prevented, and the beads can he formed at a uniform deposition height.

(2) The deposition planning method of an additively manufactured object according to (1), in which in the step of determining the welding conditions of the intersection region paths, the deposit amount changes by changing a welding rate of the upper layer path in the intersection region paths to be slower than a welding rate of the lower layer path.

In the deposition planning method of an additively manufactured object, the deposit amount can be appropriately adjusted by changing the welding rate that can be easily adjusted.

(3) The deposition planning method of an additively manufactured object according to (2), in which in the process of forming the weld beads from the constant portion to the intersection portion, the change of the welding rate starts from a position moved back from a center position of the intersection portion by a length that is half of a bead width of the constant portion orthogonal to a bead longitudinal direction.

In the deposition planning method of an additively manufactured object, local excess and deficiency in deposit amount in the portion where the deposit amount changes can be resolved, and a smooth bead shape can be formed. Accordingly, the occurrence of local unevenness of the additively manufactured object can be prevented.

(4) The deposition planning method of an additively manufactured object according to (2), in which in the process of forming the weld beads from the constant portion to the intersection portion, the welding rate changes such that a position moved back from a center position of the intersection portion by a length that is half of a head width of the constant portion orthogonal to a bead longitudinal direction is a center position in a range from a change start point to a change end point of the welding rate.

In the deposition planning method of an additively manufactured object, by continuously changing the welding rate, local excess and deficiency in deposit amount can be resolved more reliably, and a smooth bead shape can be formed.

(5) The deposition planning method of an additively manufactured object according to any one of (2) to (4), in which not only the welding rate but also a feeding rate of the filler metal changes.

In the deposition planning method of an additively manufactured object, by changing not only the welding rate but also the feeding rate of the filler metal, the adjustment width can be expanded.

(6) The deposition planning method of an additively manufactured object according to (1), in which in the step of determining the welding conditions of the intersection region paths, in the intersection region paths, the formation of the weld beads along the lower layer path is stopped and the weld beads are formed only along the upper layer path.

In the deposition planning method of an additively manufactured object, by forming the intersection portion using only the upper layer path while keeping the welding trajectories of the lower layer paths in the constant portion and the intersection portion continuous, a gap is not likely to be generated at a boundary between the constant portion and the intersection portion, and the occurrence of an internal defect can be suppressed.

(7) The deposition planning method of an additively manufactured object according to (6), in which at time of restart from the stop of the formation of the weld beads, a feeding rate of the filler metal is set to be lower than a feeding rate before the stop of the formation of the weld beads to gradually increase from the low rate to the feeding rate before the stop of the formation.

In the deposition planning method of an additively manufactured object, even at the time of restart from the temporary stop of the bead formation, weld beads can be formed smoothly and continuously.

(8) The deposition planning method of an additively manufactured object according to (7), in which until the feeding rate of the filler metal reaches the feeding rate before the stop of the formation of the weld beads from the restart, a welding rate gradually decreases from a welding rate of the intersection region paths to a welding rate of the constant region paths.

In the deposition planning method of an additively manufactured object, the feeding rate of the filler metal and the welding rate are adjusted in combination. Therefore, the deposit amount can be controlled more accurately, and the weld beads can be formed more smoothly.

(9) The deposition planning method of an additively manufactured object according to any one of (1) to (8), in which in the step of determining the welding conditions of the intersection region paths, when the lower layer deposit amount is represented by S1 and the upper layer deposit amount is represented by S2, a ratio S1/(S1+S2) of the lower layer deposit amount S1 to a total deposit amount (S1+S2) is set depending on a gap between a plurality of the weld beads in the intersection portion.

In the deposition planning method of an additively manufactured object, by managing the lower layer deposit amount and the upper layer deposit amount at the predetermined ratio, the deposit amount in the intersection portion can be determined more accurately.

(10) A deposition plan making apparatus that makes a deposition plan in which an additively manufactured object is formed using shape data representing a three-dimensional shape of the additively manufactured object by an additive manufacturing apparatus that deposits weld beads obtained by melting and solidifying a filler metal, the deposition plan making apparatus including:

a data acquisition unit configured to acquire the shape data;

a welding path determination unit configured to determine a plurality of welding paths along which each of layers sliced from the three-dimensional shape of the additively manufactured object represented by the shape data is formed using the weld heads;

a welding path classification unit configured to classify the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

an upper and lower layer division unit configured to divide each of the intersection region paths into a lower layer path along which a lower layer of the intersection portion is formed and an upper layer path along which an upper layer of the intersection portion is formed; and a welding condition determination unit configured to determine welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other.

In the deposition planning apparatus of an additively manufactured object, the intersection region paths are divided into the upper layer path and the lower layer path, and the welding conditions are set for each of the paths The deposition plan can be easily made, in which the occurrence of an internal defect in the intersection portion where the weld beads intersect with each other can be prevented, and the beads can be formed at a uniform deposition height.

(11) A program causing a computer to execute an additive manufacturing procedure for an additively manufactured object, in which the additively manufactured object is formed using shape data representing a three-dimensional shape of the additively manufactured object by an additive manufacturing apparatus that deposits weld beads obtained by melting and solidifying a filler metal, the additive manufacturing procedure including:

a function of acquiring the shape data;

a function of determining a plurality of welding paths along which each of layers sliced from the three-dimensional shape of the additively manufactured object represented by the shape data is formed using the weld beads;

a function of classifying the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

a function of dividing each of the intersection region paths into a lower layer path along which a lower layer of the intersection portion is formed and an upper layer path along which an upper layer of the intersection portion is formed; and a function of determining welding conditions of the intersection region paths such that an upper layer deposit amount per unit length of weld beads formed along the upper layer path is more than a lower layer deposit amount per unit length of weld heads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld heads adjacent to each other overlap each other.

With this program, the deposition plan can be easily made, in which the occurrence of an internal defect in the intersection portion where the weld beads intersect with each other can he prevented, and the beads can be formed at a uniform deposition height, The present application is based on Japanese patent application No. 2021-25576 filed on Feb. 19, 2021, the content of which is incorporated herein by reference.

REFERENCE SIGNS LIST

11: additive manufacturing apparatus
13: controller
15: power supply device
17: torch
19: welding robot
21: filler metal supply unit
23: base plate
25: additively manufactured object
27: deposition planning unit
29: storage unit
31: control unit
33: data acquisition unit
35: welding path determination unit
37: welding path classification unit
39: upper and lower layer division unit
41: welding condition determination unit
100: manufacturing apparatus
B, B1, B2, B3, B4, B5, B6: weld bead
CR: intersection portion
L1, L2, L3, L4, L5, L6, La, Lb: welding path
$L_C$: intersection region path
$L_{R1}$, $L_{R2}$: constant region path
M: filler metal (welding wire)
$P_C$: intersection point
RE: constant portion
S: deposit amount
S1: lower layer deposit amount (deposit amount)
S2: upper layer deposit amount (deposit amount)
V1, V2, $V_{a1}$, $V_{a2}$, $V_{b1}$, $V_{b2}$; welding rate
θ: angle

The invention claimed is:

1. A deposition planning method for an additively manufactured object, in which the additively manufactured object is formed using shape data representing a three- dimensional shape of the additively manufactured object by an additive manufacturing apparatus that deposits weld beads obtained by melting and solidifying a filler metal, the deposition planning method comprising:

acquiring the shape data;

determining a plurality of welding paths along which each of layers sliced from the three-dimensional shape of the additively manufactured object represented by the shape data is formed using the weld beads;

classifying the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

dividing each of the intersection region paths into a lower layer path along which a lower layer of the intersection portion is formed and an upper layer path along which an upper layer of the intersection portion is formed; and determining welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other, wherein in the determining of the welding conditions of the intersection region paths, when the lower layer deposit amount is represented by S1 and the upper layer deposit amount is represented by S2, a ratio S1/(S1+S2) of the lower layer deposit amount S1 to a total deposit amount (S1+S2) is set depending on a gap between a plurality of the weld beads in the intersection portion.

2. The deposition planning method of an additively manufactured object according to claim 1, wherein in the determining of the welding conditions of the intersection region paths, the deposit amount changes by changing a welding rate of the upper layer path in the intersection region paths to be slower than a welding rate of the lower layer path.

3. The deposition planning method of an additively manufactured object according to claim 2, wherein in the process of forming the weld beads from the constant portion to the intersection portion, the change of the welding rate starts from a position moved back from a center position of the intersection portion by a length that is half of a bead width of the constant portion orthogonal to a bead longitudinal direction.

4. The deposition planning method of an additively manufactured object according to claim 2, wherein in the process of forming the weld beads from the constant portion to the intersection portion, the welding rate changes such that a position moved back from a center position of the intersection portion by a length that is half of a bead width of the constant portion orthogonal to a bead longitudinal direction is a center position in a range from a change start point to a change end point of the welding rate.

5. The deposition planning method of an additively manufactured object according to claim 2, wherein not only the welding rate but also a feeding rate of the filler metal changes.

6. The deposition planning method of an additively manufactured object according to claim 1, wherein in the determining of the welding conditions of the intersection region paths, in the intersection region paths, the formation of the weld beads along the lower layer path is stopped and the weld beads are formed only along the upper layer path.

7. The deposition planning method of an additively manufactured object according to claim 6, wherein at time of restart from the stop of the formation of the weld beads, a feeding rate of the filler metal is set to be lower than a feeding rate before the stop of the formation of the weld beads to increase from the low rate to the feeding rate before the stop of the formation.

8. The deposition planning method of an additively manufactured object according to claim 7, wherein until the feeding rate of the filler metal reaches the feeding rate before the stop of the formation of the weld beads from the restart, a welding rate decreases from a welding rate of the intersection region paths to a welding rate of the constant region paths.

9. A computer program product comprising a non-transitory computer readable storage medium having instructions encoded thereon that, when executed by a processor, cause the processor to execute an additive manufacturing procedure for an additively manufactured object, in which the additively manufactured object is formed using shape data representing a three-dimensional shape of the additively manufactured object by an additive manufacturing apparatus that deposits weld beads obtained by melting and solidifying a filler metal, the additive manufacturing procedure comprising:

acquiring the shape data;

determining a plurality of welding paths along which each of layers sliced from the three-dimensional shape of the additively manufactured object represented by the shape data is formed using the weld beads;

classifying the plurality of the welding paths in the same layer of each of the layers into intersection region paths corresponding to an intersection portion and constant region paths corresponding to constant portions other than the intersection portion, the intersection portion being formed by intersection of a portion where a plurality of the weld beads are formed adjacent to each other with another plurality of the weld beads;

dividing each of the intersection region paths into a lower layer path along which a lower layer of the intersection portion is formed and an upper layer path along which an upper layer of the intersection portion is formed; and determining welding conditions of the intersection region paths such that an upper layer deposit amount per unit length of weld beads formed along the upper layer path is more than a lower layer deposit amount per unit length of weld beads formed along the lower layer path, a sum of the upper layer deposit amount and the lower layer deposit amount is equal to a deposit amount per unit length of weld beads formed along the constant region paths, and in a cross-section orthogonal to a longitudinal direction of the weld beads formed along the upper layer path, profiles of the weld beads adjacent to each other overlap each other, wherein in the determining of the welding conditions of the intersection region paths, when the lower layer deposit amount is represented by S1 and the upper layer deposit amount is represented by S2, a ratio S1/(S1+S2) of the lower layer deposit amount S1 to a total deposit amount (S1+S2) is set depending on a gap between a plurality of the weld beads in the intersection portion.

* * * * *